(12) United States Patent
Budhathoki et al.

(10) Patent No.: US 11,375,368 B2
(45) Date of Patent: Jun. 28, 2022

(54) DETECTING AND PREVENTING AN ADVERSARIAL NETWORK ENTITY FROM TRACKING A WIRELESS DEVICE'S LOCATION

(71) Applicant: QUALCOMM Incorporated, San Diego, CA (US)

(72) Inventors: Krishna Ram Budhathoki, San Diego, CA (US); Subrato Kumar De, San Diego, CA (US); Mattias Kaulard Huber, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 16/574,013

(22) Filed: Sep. 17, 2019

(65) Prior Publication Data
US 2021/0084492 A1  Mar. 18, 2021

(51) Int. Cl.
*H04W 12/06* (2021.01)
*H04L 9/08* (2006.01)
(Continued)

(52) U.S. Cl.
CPC ........... *H04W 12/06* (2013.01); *H04L 9/0869* (2013.01); *H04L 9/3213* (2013.01); *H04L 9/3242* (2013.01); *H04W 12/03* (2021.01)

(58) Field of Classification Search
None
See application file for complete search history.

(56) References Cited

U.S. PATENT DOCUMENTS

| 6,311,276 | B1 * | 10/2001 | Connery | H04L 12/413 726/13 |
| 2009/0267730 | A1 * | 10/2009 | Zhang | H04L 9/3273 340/5.8 |

(Continued)

OTHER PUBLICATIONS

Arrko et al. "Extensible Authentication Protocol Method for 3rd Generation Authentication and Key Agreement" [online], IETF RFC 4187, Jan. 2006, Retrieved from the Internet: URL: https://datatracker.ietf.org/doc/html/rfc4187 (Year: 2006).*

*Primary Examiner* — Taghi T Arani
*Assistant Examiner* — Joshua Raymond White
(74) *Attorney, Agent, or Firm* — The Marbury Law Group, PLLC

(57) ABSTRACT

Methods for detecting and preventing an adversarial network entity (e.g., fake base stations, etc.) from tracking a wireless device's location. A wireless device may be equipped with a random value (RAND) database or cache memory RAND values previously received by the wireless device. In response to receiving an authentication request message from a network component, performing AKA procedures and determining that the authentication failed, the wireless device may compare the RAND value included in the received authentication request message to RAND values stored in secure storage memory. The wireless device may generate an authentication response message that includes an error code that is different than standard error code used so that the target wireless device can't be differentiated from other wireless devices thereby preventing tracking in response to determining that the RAND value included in the received authentication request message is included in the RAND secure storage memory.

22 Claims, 7 Drawing Sheets

(51) Int. Cl.
*H04L 9/32* (2006.01)
*H04W 12/03* (2021.01)

(56) References Cited

U.S. PATENT DOCUMENTS

| | | | |
|---|---|---|---|
| 2010/0011220 A1* | 1/2010 | Zhao | H04L 9/3271 |
| | | | 726/28 |
| 2020/0068391 A1* | 2/2020 | Liu | H04L 63/162 |

* cited by examiner

DETECTING AND PREVENTING AN ADVERSARIAL NETWORK ENTITY FROM TRACKING A WIRELESS DEVICE'S LOCATION

BACKGROUND

Long Term Evolution (LTE), 5G new radio (NR), and other recently developed communication technologies allow wireless devices to communicate information at data rates (e.g., in tell is of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, autonomous vehicles, and other technologies that rely on consistent and secure wireless communications. As a result, billions of small, mobile, or resource constrained computing devices (e.g., smartphones, watches, smart appliances, autonomous vehicles, etc.) now use Internet protocol (IP) and cellular communication networks to communicate critical and mundane information.

Concurrent with the above trends, software defined radio (SDR) chips and universal software radio peripheral (USRP) boards have become less expensive and are now widely available. Open source LTE/3G stacks allow programmers to quickly install and operate a base station via a laptop computer. These technologies have dramatically reduced the costs associated with setting up and operating a base station in a shell telecommunication network.

Due to these trends, wireless devices and cellular communication networks are increasingly vulnerable to sophisticated cyber-attacks launched by adversarial network entities (e.g., fake or malicious base stations, etc.) that can spoof the base stations of network service providers. Such attacks may be used by nefarious actors to track users, map communication networks, launch denial of service attacks, drain the battery and processing resources of resource constrained computing devices, and otherwise disrupt or hinder the services provided by communication networks and service providers.

SUMMARY

Various aspects include methods that may be implemented in a processor in a wireless device for detecting adversarial network entities. Various aspects may include receiving an authentication request message that includes an authentication token (AUTN) and a random value (RAND) from a network entity, determining whether a message authentication code (MAC) associated with the authentication token (AUTN) included in the received authentication request message is valid, determining whether a sequence number ($SQN_{NN}$) in the received authentication request message is in a valid range in response to determining that the MAC is valid, determining whether the random value (RAND) included in the received authentication request message matches another random value (RAND) stored in a memory of the wireless device in response to determining that the $SQN_{NN}$ of the received authentication request message is not in the valid range, and determining that the network entity is an adversarial network entity in response to determining that the MAC is valid, the $SQN_{NN}$ of the received authentication request message is not in the valid range, and the random value (RAND) included in the received authentication request message matches another random value (RAND) stored in the memory of the wireless device.

Some aspects may include generating an authentication response message that includes a standard authentication failure error code that indicates that the $SQN_{NN}$ of the received authentication request message is not in the valid range in response to determining that the random value (RAND) included in the received authentication request message does not match another random value (RAND) stored in the memory of the wireless device, generating the authentication response message to include an authentication failure error code in a way so that is it not possible to differentiate the targeted wireless device from other wireless devices as there is no differentiating error code in response to determining that the random value (RAND) included in the received authentication request message matches another random value (RAND) stored in the memory of the wireless device, and sending the generated authentication response message to the network entity.

In some aspects, generating the authentication response message that includes the standard authentication failure error code that indicates that the $SQN_{NN}$ of the received authentication request message is not in the valid range may include generating the authentication response message to include a synchronization failure error code in response to determining that the random value (RAND) included in the received authentication request message does not match another random value (RAND) stored in the memory of the wireless device, and generating the authentication response message to include the authentication failure error code in a way so that is it not possible to differentiate the targeted wireless device from other wireless devices as there is no differentiating error code may include generating the authentication response message to include a "MAC Failure" error code in response to determining that the random value (RAND) included in the received authentication request message matches another random authentication challenge value stored in the memory of the wireless device.

In some aspects, determining whether the MAC is valid may include following a standard approach of determining whether the MAC associated with the authentication token (AUTN) included in the received authentication request message was generated based on a shared secret long-term key, and determining whether the received authentication request message is recently generated may include comparing a sequence number in the valid range used for authentication ($SQN_{MS}$) stored in the memory of the wireless device with a sequence number ($SQ_{NN}$) associated with the authentication token (AUTN) included in the received authentication request message.

In some aspects, receiving the authentication request message that includes the random value (RAND) and the authentication token (AUTN) from the network entity may include receiving a random value (RAND) generated by a 128-bit Pseudo Random Number Generator (PRNG). Some aspects may include determining whether the random value (RAND) included in the received authentication request message is the same as a most recently stored random value (RAND), updating the memory of the wireless device to include the random value (RAND) included in the received authentication request message in response to determining that the random value (RAND) included in the received authentication request message is not the same as the most recently stored random value (RAND), and forgoing updating of the memory of the wireless device in response to determining that the random value (RAND) included in the received authentication request message is the same as the most recently stored random value (RAND).

In some aspects, updating the memory of the wireless device to include the random value (RAND) included in the received authentication request message may include loading an oldest-entry random value (RAND) from a secondary memory of the wireless device to an in-process memory of the wireless device, and storing the random value (RAND) included in the received authentication request message in the secondary memory of the wireless device. In some aspects, determining whether the random value (RAND) included in the received authentication request message matches another random value (RAND) stored in the memory of the wireless device may include determining whether the random value (RAND) included in the received authentication request message matches another random value (RAND) stored in the in-process memory of the wireless device.

Further aspects include a wireless device having a memory, wireless transceiver and a processor coupled to the memory and wireless transceiver and configured with processor-executable instructions to perform operations corresponding to any of the methods summarized above. Further aspects include a wireless device having means for performing functions corresponding to any of the methods summarized above. Further aspects include a non-transitory processor-readable storage medium having stored thereon processor-executable instructions configured to cause a processor of a wireless device to perform operations corresponding to any of the methods summarized above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Figure 1:
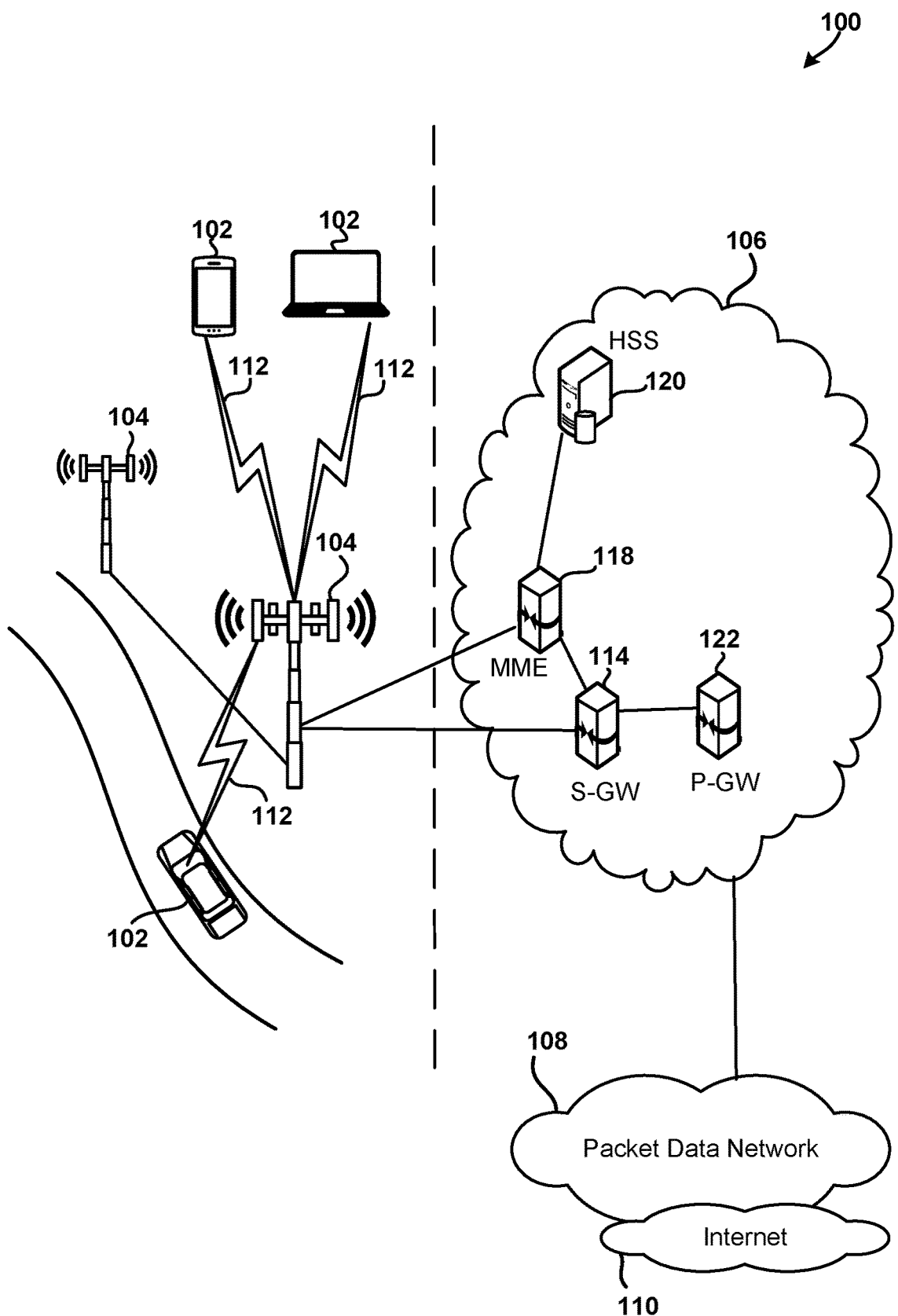
FIG. 1 is a communication system block diagram illustrating network components of an example telecommunication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and wireless devices configured to implement the methods, for detecting and preventing an adversarial network entity (e.g., fake base stations, etc.) from tracking a wireless device's location. A wireless device may be configured to receive an authentication request message that includes a random value (RAND) and an authentication token (AUTN) from a network entity as part of an Authentication and Key Agreement (AKA) procedure. The wireless device may determine whether the wireless device is an intended or targeted recipient of the authentication request message based on a message authentication code (MAC) associated with the authentication token (AUTN) and whether the received authentication request message is a "recently generated" based on a sequence number ($SQN_N$) associated with the authentication token (AUTN). In response to determining that the wireless device is an intended or targeted recipient but the received authentication request message is not recently generated, the wireless device may determine whether the random value (RAND) included in the received authentication request message matches a random value (RAND) stored in a memory of the wireless device. The wireless device may generate an authentication response message that includes an authentication failure error code (e.g., "MAC Failure") that is different from the standard authentication failure error code used to indicate that the received authentication request message is not recently generated (e.g., a "Sync Failure" or "SQN failure") in response to determining that the random value (RAND) included in the received authentication request message matches a random value (RAND) stored in the memory of the wireless device.

That is, the wireless device may be equipped with a RAND database or cache memory (non-volatile memory) that stores previously received random values (RAND) (e.g., all unique random values (RAND) random values (RAND) of authentication request messages received in the past day, week, month, etc.). In response to receiving an authentication request message from a network component (e.g., base station) as part of the AKA procedure, the wireless device may compare the random value (RAND) included in the received authentication request message to the values stored in the RAND secure storage memory. The wireless device may determine that there is a high probability that the authentication request message was sent from an adversarial network entity in response to determining that the authentication failed and that the random value (RAND) included in the received authentication request message is the same as another previously received random value (RAND) that is stored in the RAND secure storage memory.

In response to determining that there is a high probability that the authentication request message was sent from an adversarial network entity, the wireless device may generate an authentication response message that includes an error code that is different than standard error code used for that failure. For example, if the authentication fails in the wireless device due to a synchronization failure, rather than generating and sending an authentication response message that indicates "Synchronization Failure" as the cause, the wireless device may send the network entity an authentication response message that indicates "Message Authentication Code Failure."

By using an error code that is different from standard error code used for a particular failure, the wireless device may prevent adversarial network entity (e.g., fake base stations, etc.) from using the error codes it receives from the targets of its attacks from it receives from other wireless devices that are in the same area as targeted devices.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "user equipment" and "wireless device" may be used interchangeably herein to refer to any one or all of IOT devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals. While various embodiments are particularly useful in wireless devices, such as smartphones and tablets, the embodiments are generally useful in any electronic device that includes communication circuitry for accessing wireless IP and data services through cellular and wireless communication networks.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Some wireless devices include a subscriber identification module (SIM) hardware, memory, or card that stores information required by one or more radio systems (e.g., in a cellular communication network base station, etc.) to identify, authenticate, and/or locate the wireless device. The SIM may store one or more authentication keys, an international mobile subscriber identity (IMSI) value, a secret long-term key ($K_{IMSI}$), a temporary mobile subscriber identity (TMSI) value, a location area code (LAC), a home public land mobile network (HPLMN) value, and other similar identification, authentication, or location information.

An IMSI value may be a sixty-four (64) bit field or a fifteen (15) digit number that serves as an identifier for the wireless device and network. The first three digits of an IMSI value may store a Mobile Country Code (MCC) value, the next three digits may store a Mobile Network Code (MNC) value, and the remaining nine (9) digits may store a Mobile Subscription Identification Number (MSIN). The combination of the MCC and MNC values may uniquely identify a specific cellular service provider (e.g., AT&T, Verizon, etc.) network and in a specific country. The MSIN value may uniquely identify the wireless device and/or the wireless device user.

The IMSI value includes sensitive identification information that may be used by nefarious actors to track the wireless device (and thus its user) or launch cyber-attacks. For security reasons, in LTE and other advanced communication networks, wireless devices typically only transmit their IMSI value during the initial random-access procedure in which they establish a connection to the network (e.g., after the device is powered on, moved to a new network location, etc.).

A TMSI value is a randomly assigned temporary identifier that may be used to uniquely identify and address a wireless device. The TMSI value may be assigned to a wireless device by mobile switching center or visitor location register shortly after the initial random-access procedure. The TMSI value may be specific to the wireless device's current cell or tracking area, and updated each time the wireless device is moved to a new tracking area. For security purposes, the TMSI is the identity value that is most commonly communicated between the wireless device and the base stations.

A telecommunication network typically includes a plurality of base stations (e.g., eNodeBs in LTE), which may act as a bridge (e.g., layer 2 bridge) between the wireless devices and the network by serving as the termination point of all radio protocols towards the wireless devices, and relaying voice (e.g., VoIP, etc.), data, and control signals to network components within the network. Each base station generally covers a small geographical area. Groups of bases stations make up a location area, routing area, or tracking area (TA).

Long Term Evolution (LTE), 5G new radio (NR), and other modern communication networks may utilize unencrypted broadcast signals to transmit essential information from a cellular communication network component (e.g., a base station, another network component that communicates with the wireless device through the base station, etc.) to a wireless device. The wireless device may receive and use these broadcast signals to register with the network through an Authentication and Key Agreement (AKA) procedure that achieves mutual authentication between a wireless device and the network, and establishes shared session keys to be used to secure the subsequent communications.

The AKA procedure may include the network component computing/determining a random value (RAND) and an authentication token (AUTN) that includes a message authentication code (MAC) and a sequence number ($SQN_N$). The network component may generate an authentication request message that includes the computed random value (RAND) and authentication token (AUTN) values, and send the generated authentication request message to the wireless device via unencrypted broadcast signals. The network component may compute a new random value (RAND) for each message using a 128-bit Pseudo Random Number Generator (PRNG) so that the probability of two broadcast random values (RAND) being the same is very low, even over multitude of broadcasts over a very long period of time.

The wireless device may receive the authentication request message, and perform message authentication code (MAC) verification operations to verify that the authentication request message was intended for the wireless device. The MAC verification operations may include the wireless device determining whether the MAC included in the received authentication request message was generated based on the shared secret long-term key ($K_{IMSI}$). In response to determining that the authentication request message was not intended for the wireless device (e.g., that the MAC included in the received authentication request message was not generated based on the shared secret long-term key ($K_{IMSI}$), etc.), the wireless device may request that the network component perform an "identification" procedure by generating and sending the network component an authentication failure message that indicates "MAC Failure" as the cause of failure.

The wireless device may also verify that the authentication request message was recently generated by comparing a sequence number in the valid range used for authentication ($SQN_{MS}$) stored in the memory of the wireless device with the sequence number ($SQN_N$) included the received authentication request message. In response to determining that the authentication request message is intended for the wireless device but is not recently generated (e.g., that the $SQN_{MS}$ stored in memory does not match or is not consistent with the $SQN_N$ included the received authentication request message), the wireless device may request that the network component perform an "resynchronization" procedure by generating and sending the network component an authentication failure message that indicates "Sync Failure" as the cause of failure.

Thus, the network component sends an authentication request message that includes random value (RAND) and an authentication token (AUTN) to a wireless device via unencrypted broadcast signals. If the AKA procedure fails in the wireless device, the wireless device responds with a one of two types of error messages (e.g., "MAC Failure" or "Sync Failure" error codes) depending on whether the MAC verification fails or the verification that the authentication request message was recently generated fails. Due to these characteristics, a malicious or nefarious actor may trace the movements of a victim wireless device.

For example, a malicious or nefarious actor intercept the unencrypted authentication request message containing the pair (RAND, AUTN) sent towards a target wireless device, and repeatedly or periodically rebroadcast (or "replay") the intercepted message in a monitored area for reception by all of wireless devices that are within that area. Wireless devices that were not the intended recipient of the intercepted message may determine that the MAC included in the rebroadcast message was not generated based on their shared secret long-term key ($K_{IMSI}$), and respond with an authentication failure message that indicates "MAC Failure" as the cause of failure. On the other hand, the target wireless device may determine that the MAC included in the rebroadcast intercepted message was generated based on its shared secret long-term key ($K_{IMSI}$) but that that the $SQN_{MS}$ stored in its memory does not match or is not consistent with the $SQN_N$ included the received authentication request message (i.e., that the message is not recently generated). In response, the target wireless device will respond with an authentication failure message that indicates "Sync Failure" as the cause of failure, thereby informing the malicious or nefarious actor that the target wireless device is within the monitored area. The malicious/nefarious actor may rebroadcast the signal in multiple areas, and trace the movements of the victim wireless device through those areas.

Because there are multiple valid and important reasons for communicating authentication failure messages that indicate "Sync Failure" as the cause of failure (e.g., to request that the network component perform an "resynchronization" procedure, etc.), it may be challenging for a wireless device to detect, prevent or respond to the replay/traceability attack described above using conventional solutions.

The various embodiments may include a wireless device that is configured to detect, prevent or respond to replay or traceability attacks by intelligently determining whether an AKA synchronization failure detected in the wireless device is due to an exploit or traceability attack launched by a malicious or nefarious actor.

In some embodiments, the wireless device may be configured to store all random values (RAND) received by the wireless device within a configurable period of time (e.g., hour, day, week, month, etc.) in a RAND database or cache memory of the wireless device. In some embodiments, the wireless device may store the random values (RAND) in a non-volatile memory so that they are available to the wireless device across device reboots. In some embodiments, the wireless device may store the random values (RAND) in process memory (heap, stack, static global array, etc.).

In some embodiments, the wireless device may be configured to, as part of the AKA MAC verification operations or the AKA verification that the authentication request message was recently generated operations, compare the random value (RAND) included in the received authentication request message to the random values (RAND) stored in the RAND secure storage to determine whether the wireless device previously received and stored that random value (RAND). Because the network components compute a new random value (RAND) for each message using a 128-bit Pseudo Random Number Generator (PRNG), probability that the wireless device received the same random value (RAND) twice is extremely low, even over multitude of broadcasts over a very long period of time. As such, the wireless device may determine that a replay or traceability attack is underway in response to determining that the MAC included in the received authentication request message was generated based on the shared secret long-term key ($K_{IMSI}$) but that the random value (RAND) is the same as another random value (RAND) previously received by the wireless device and stored in the RAND secure storage.

In some embodiments, the wireless device may be configured to update the RAND secure storage memory by comparing a random value (RAND) included in a received authentication request message to the most recently saved random value (RAND) stored in the RAND secure storage. In some communication systems, such as those that implement ETSI TS 124 301 V15.4.0 (2018-10), the network components may be configured to immediately resend the same authentication request message having the same random value (RAND) if there is a high probability that the message will be received by the wireless device due a radio link failure, etc. Therefore, in some embodiments, the received random value (RAND) may not be saved if the random value (RAND) in the received authentication request message is already saved in the RAND secure storage memory. However, the repeated random value (RAND) may be moved to the top of a list of recently saved random values (RAND). This avoids adding duplicate entries into the RAND secure storage memory or incorrectly determining that a replay or traceability attack is underway when the wireless device receives a legitimately resent message.

In some embodiments, the wireless device may be configured to generate and send to the network component an authentication failure message that indicates "MAC Failure" as the cause of failure (e.g., a MAC_FAILURE message) in response to determining that a replay or traceability attack is underway (e.g., in response to determining that the random value (RAND) included in the received authentication request message is the same as any of the random values (RAND) stored in the secure storage, etc.). By indicating "MAC Failure" (rather than "Sync Failure") as the cause of failure, the wireless device may prevent the malicious or nefarious actor from distinguishing the response received from its target from those it receives from all of the other wireless devices that are within the monitored area.

As discussed above, a wireless device may request that the network component perform a "resynchronization" procedure by generating and sending the network component an authentication failure message that indicates synchronization failure ("Sync Failure" or SQN failure) as the cause of failure in response to determining that the $SQN_{MS}$ stored in memory does not match or is not consistent with the $SQN_N$ included the received authentication request message. Such synchronization failures are triggered by the wireless device only if the $SQN_N$ (or SEQ#) is beyond a range defined by $SQN_{MS}$ (IN-RANGE SEQ#).

It may be unnecessary for the wireless device store the recent random values (RAND) from authentication request messages that are associated with the IN-RANGE SEQ#. However, the random values (RAND) associated with the current IN-RANGE SEQ# may fall out of range at a future time, and will be needed as soon as they become out of range as the SEQ# keeps on increasing (new SEQ#s coming with new authentication request messages). As such, the wireless device may need to store the random values (RAND) associated with the current IN-RANGE SEQ# for the future when their associated SEQ# are in 'out of range." This may increase the in-process memory requirements of the wireless device, and require that the wireless device include or maintain a large RAND secure storage.

To reduce the amount of in-process memory used by the wireless device, rather than storing the random values (RAND) associated with an in-range SEQ# in the in-process memory (heap, stack, static global array, etc.), the wireless device may be configured to store the random values (RAND) associated with an in-range SEQ# in a backup store/secondary storage (with optional integrity protection). The wireless device may maintain a sliding window so that when a SEQ# goes 'out of range,' the wireless device loads the random values (RAND) associated with those 'out of range' SEQ# from the backup store/secondary storage to the in-process memory. For example, when the wireless device receives a new authentication request message, the wireless device adds the random value (RAND) to an IN-RANGE group stored the secondary storage, and moves the oldest entry random value (RAND) from the IN-RANGE group stored in secondary storage to an OUT-OF-RANGE group stored in the in-process memory (heap, stack, static global array, etc.) of the wireless device.

FIG. 1 illustrates an example Evolved Packet System (EPS), Long Term Evolution (LTE) or evolved universal terrestrial radio access network (E-UTRAN) communication network 100 in which the various embodiments may be implemented. In the example illustrated in FIG. 1, the network 100 includes wireless devices 102, base stations 104, and various network components 106 for communicating with a packet data network (PDN) 108 and ultimately the Internet 110. The PDN 108 may include an operator IP services network, an Intranet, an IP multimedia subsystem (IMS), a PS streaming service (PSS) network, etc.

The wireless devices 102 may be configured to transmit and receive voice, data, and control signals to and from the base stations 104 via wireless communication links 112. The base stations 104 may include an evolved Node B (eNodeB), a remote radio head (RRH), a femto cell, pico cell, micro cell, a base transceiver station (BTS), a radio base station, a radio transceiver, a transceiver function, a basic service set (BSS), an extended service set (ESS), etc.

The base stations 104 may be configured to provide user plane (e.g., PDCP, RLC, MAC, PHY) and control plane (RRC) protocol terminations towards the wireless devices 102. The base stations 104 may act as a bridge (e.g., layer 2 bridge) between the wireless devices 102 and the network components 106 by serving as the termination point of all radio protocols towards the wireless devices 102, and relaying voice (e.g., VoIP, etc.), data, and control signals to the network components 106 in the core network. The base stations 104 may also be configured to perform various radio resource management operations, such as controlling the usage of radio interfaces, allocating resources based on requests, prioritizing and scheduling traffic according to various quality of service (QoS) requirements, and monitoring the usage of network resources. In addition, the base stations 104 may be configured to collect radio signal level measurements, analyze the collected radio signal level measurements, and handover wireless devices 102 (or connections to the wireless devices) to other base stations 104 (e.g., a second eNodeB) based on the results of the analysis.

The network components 106 may include various logical and/or functional components that serve as the primary point of entry and exit of wireless device traffic and/or connect the wireless devices 102 to their immediate service provider, the PDN 108 and ultimately the Internet 110. The network components 106 may be configured to forward the voice, data, and control signals to other components in the core network as user data packets, provide connectivity to external packet data networks, manage and store contexts (e.g. network internal routing information, etc.), and act as an anchor between different technologies (e.g., 3GPP and non- 3GPP systems). The network components 106 may also coordinate the transmission and reception of data to and from the Internet 110, as well as the transmission and reception of voice, data and control information to and from an external service network, the PDN 108, other base stations 104, and to other wireless devices 102.

In the example illustrated in FIG. 1, data transmitted from the wireless devices 102 is received by a base station 104 (eNodeB). The base station 104 may send signaling/control information (e.g., information pertaining to call setup, security, authentication, etc.) to a mobility management entity (MME) 118. The MME 118 may request user/subscription information from a home subscriber server (HSS) 120, perform various administrative tasks (e.g., user authentication, enforcement of roaming restrictions, etc.), and send authentication and administrative information to the signaling gateway (SGW) 114 and/or the base station 104. The base station 104 may receive authentication information from the MME 118 (e.g., an authentication complete indication, an identifier of a selected SGW, etc.), and send data received from the wireless device 102 to the SGW 114. The SGW 114 may store information about the received data (e.g., parameters of the IP bearer service, etc.) and forward user data packets to a packet data network gateway (PGW) 122, which facilitates communications with the PDN 108 and ultimately the Internet 110.

The base stations 104 may be configured to manage the scheduling and transmission of paging messages originated from the MME 118, the scheduling and transmission of broadcast information originated from the MME 118, and the scheduling and transmission of public warning system (e.g., earthquake and tsunami warning system, commercial mobile alert service, etc.) messages originated from the MME 118.

The base stations 104 may be connected to the other base stations 104 via an X2 interface/protocol. The base stations 104 may be configured to communicate with the SGW 114 and/or MME 118 via the S1 interface/protocol.

The MME 118 may be configured to perform various operations to provide various functions, including non-access stratum (NAS) signaling, NAS signaling security, access stratum (AS) security control, inter-CN node signaling for mobility between 3GPP access networks, idle mode user equipment (UE) reach-ability (including control and execution of paging retransmission), tracking area list management (e.g., for a wireless device in idle and active mode), PGW and SGW selection, MME selection for handovers with MME change, Serving GPRS Service Node (SGSN) selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization.

Figure 2A:
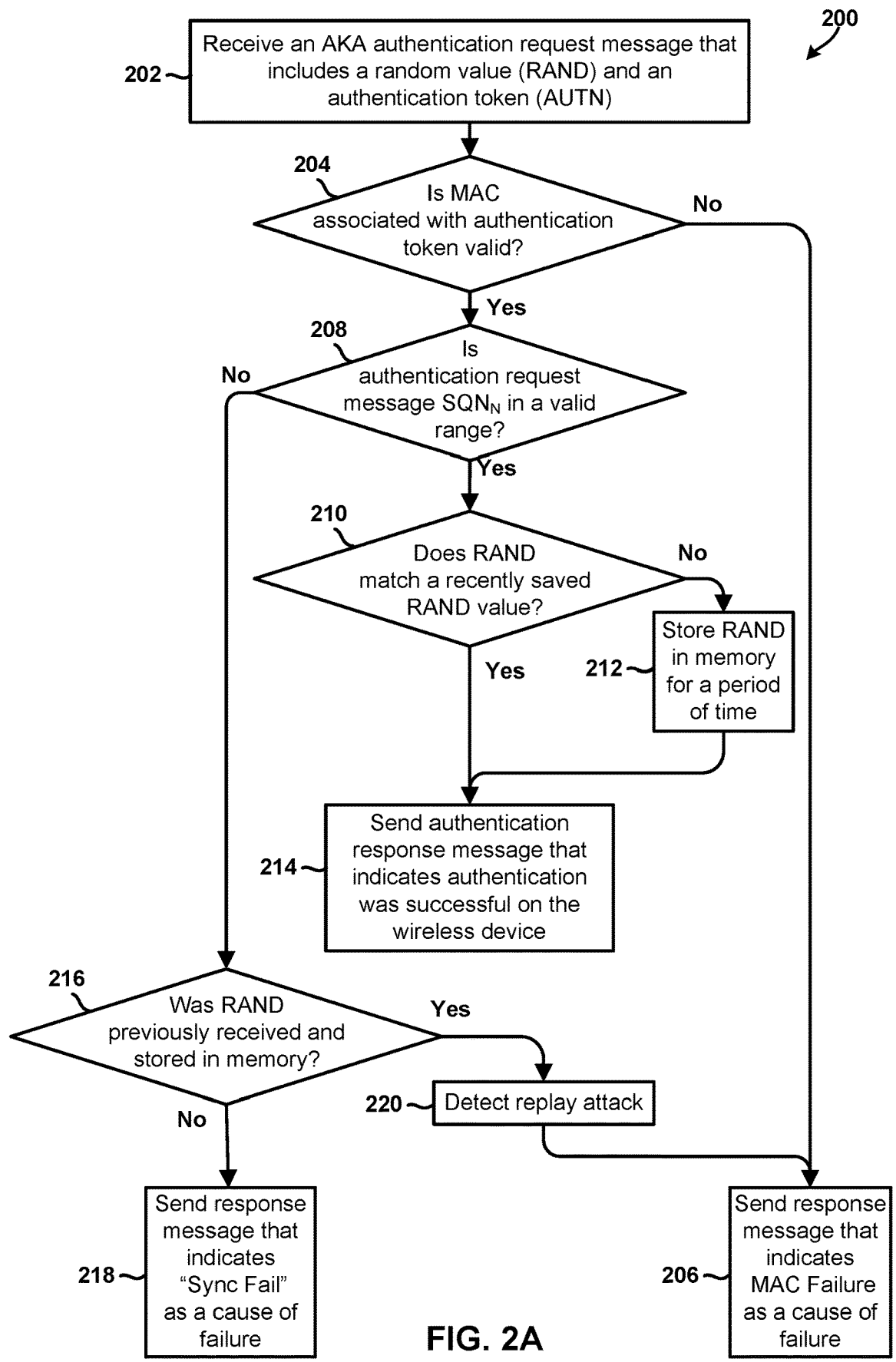
FIG. 2A is a process flow diagrams illustrating a method of detecting and preventing an adversarial network entity (fake base station) from Tracking a wireless device's location in accordance with an embodiment.

FIG. 2 illustrates a method 200 of detecting an adversarial network entity in accordance with an embodiment. The method 200 may be performed by a processor in a wireless device (e.g., wireless device 102 illustrated in FIG. 1, smartphone 500 illustrated in FIG. 5, etc.).

In block 202, a processor in a wireless device may receive an AKA authentication request message that includes a random value (RAND) and an authentication token (AUTN) from a network entity (e.g., base station). The random value (RAND) may be a 128-bit value generated via a Pseudo Random Number Generator (PRNG). The authentication token (AUTN) may be associated with a message authentication code (MAC) and a sequence number ($SQN_N$).

In determination block 204, the wireless device processor may determine whether the message authentication code (MAC) associated with the authentication token included in the received authentication request message is valid. The MAC verification operations may include the wireless device determining whether the MAC included in the received authentication request message was generated based on the shared secret long-term key ($K_{IMSI}$).

In response to determining that the MAC is not valid (i.e., determination block 204="No"), the wireless device processor may generate and send an authentication response message that indicates "MAC Failure" as a cause of failure to the network entity in block 206. For example, in response to determining that the MAC included in the received authentication request message was not generated based on the shared secret long-term key ($K_{IMSI}$), the wireless device may request that the network component perform an "identification" procedure by generating and sending the network component an authentication failure message that indicates "MAC Failure" as the cause of failure in block 206.

In response to determining that the MAC is valid (i.e., determination block 204="Yes"), the wireless device processor may determine whether the received authentication request message is recently generated by determining whether the sequence number ($SQN_N$) included in the received authentication request message is in a valid range (i.e., within a valid or expected range of values, etc.) in determination block 208. For example, in determination block 208, the wireless device processor may compare a sequence number in the valid range used for authentication ($SQN_{MS}$) stored in the memory of the wireless device with the $SQN_N$ included in the received authentication request message.

Figure 2B:
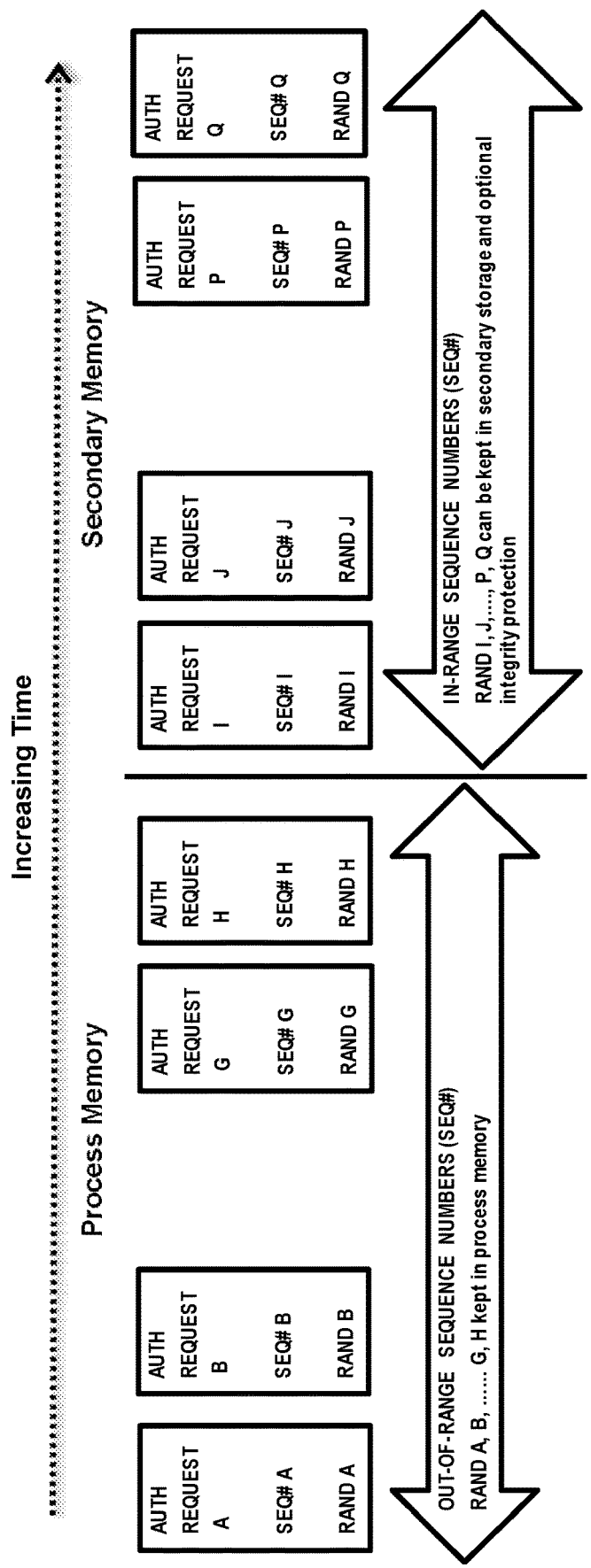
FIG. 2B is a diagram illustrating how authentication request sequence numbers and random values may be stored in process memory or secondary memory depending upon whether sequence numbers are in a valid range or out of the valid range.

FIG. 2B illustrates a method of storing random values (RAND) and sequence numbers in memory to support the comparison in determination block 208 while containing the memory requirement for storing these values. Specifically, the RANDs for the in-range $SQN_N$ may be stored a backing store/secondary storage (with optional integrity protection that is dependent on the implementation) instead of keeping the value active in the process memory (Heap, stack, static global array). Only when a $SQN_N$ goes 'out of range' is the associated RAND moved from the secondary storage/backing store into the in-process memory (Heap, stack, static global array). This provides a sliding window such that as new authentication request messages are received, a new random value (RAND) is added to the in-range set that may be maintained in secondary storage, while the oldest entry random value (RAND) is moved to the out-of-range set stored in process memory. Thus, in determination block 208 the wireless device processor may determine whether the sequence numbers in secondary memory, or alternatively to sequence numbers stored in process memory, which would indicate the received sequence number is out of range.

In response to determining that received authentication request message $SQN_N$ is in a valid range (i.e., determination block 208="Yes"), the wireless device processor may determine whether the random value (RAND) included in the received authentication request message matches a saved random value (RAND) as the history of previously received random values (RAND) in determination block 210. The most recently saved random values (RAND) may be stored in a RAND database or cache memory (non-volatile memory) that stores previously received random values (RAND) (e.g., all unique random values (RAND) received in the past day, week, month, etc.), such as in an ordered list.

Thus, storing the random values (RAND) in memory provides the processor with a history of previously received random values (RAND).

In response to determining that the random value (RAND) included in the received authentication request message does not match a recently saved random value (RAND) (i.e., determination block 210="No"), the wireless device processor may store the random value (RAND) included in the received authentication request message in memory (e.g., a RAND database or cache memory, etc.) in block 212.

In response to determining that the random value (RAND) included in the received authentication request message matches a recently saved random value (RAND) (i.e., determination block 210="Yes"), the wireless device processor may determine that the network entity is not an adverse network entity (i.e., not a fake base station, etc.), and generate and send an authentication response message that indicates authentication was successful on the wireless device to the network entity in block 214. As part of the operations in block 214, the wireless device processor may move to the top of a list of recently saved random values (RAND) stored in memory a received random value (RAND) that is not the most recently received random value (RAND). Thus, the received random value (RAND) may not be saved if the same value is already stored in the RAND secure storage memory, thereby avoiding duplication, but the stored random value (RAND) may be moved to a position in memory indicating that it is the most recently received random value (RAND).

In response to determining that the MAC is valid (i.e., determination block 204="Yes") but that the received authentication request message $SQN_N$ is not in the range (i.e., determination block 208="No"), the wireless device processor may determine whether the random value (RAND) included in the received authentication request message matches any of the random values (RAND) stored in memory (e.g., a RAND database or cache memory, etc.) in determination block 216.

In response to determining that the random value (RAND) included in the received authentication request message does not match the any of the random values (RAND) stored in memory (i.e., determination block 216="No"), the wireless device processor may request that the network component perform an "resynchronization" procedure by generating and sending the network component an authentication failure message that indicates "Sync Failure" as the cause of failure in block 218.

In response to determining that the wireless device is the intended or targeted recipient of the authentication request message (i.e., determination block 204="Yes"), that the received authentication request message is not recently generated (i.e., determination block 208="No"), and that the random value (RAND) included in the received authentication request message matches a random value (RAND) stored in memory (i.e., determination block 216="Yes"), the wireless device processor may determine that it has detected a possible replay attack or that there is a high probability that the authentication request message was sent from an adversarial network entity in block 220, and generate and send an authentication response message that indicates "MAC Failure" as a cause of failure to the network entity in block 206.

Figure 3:
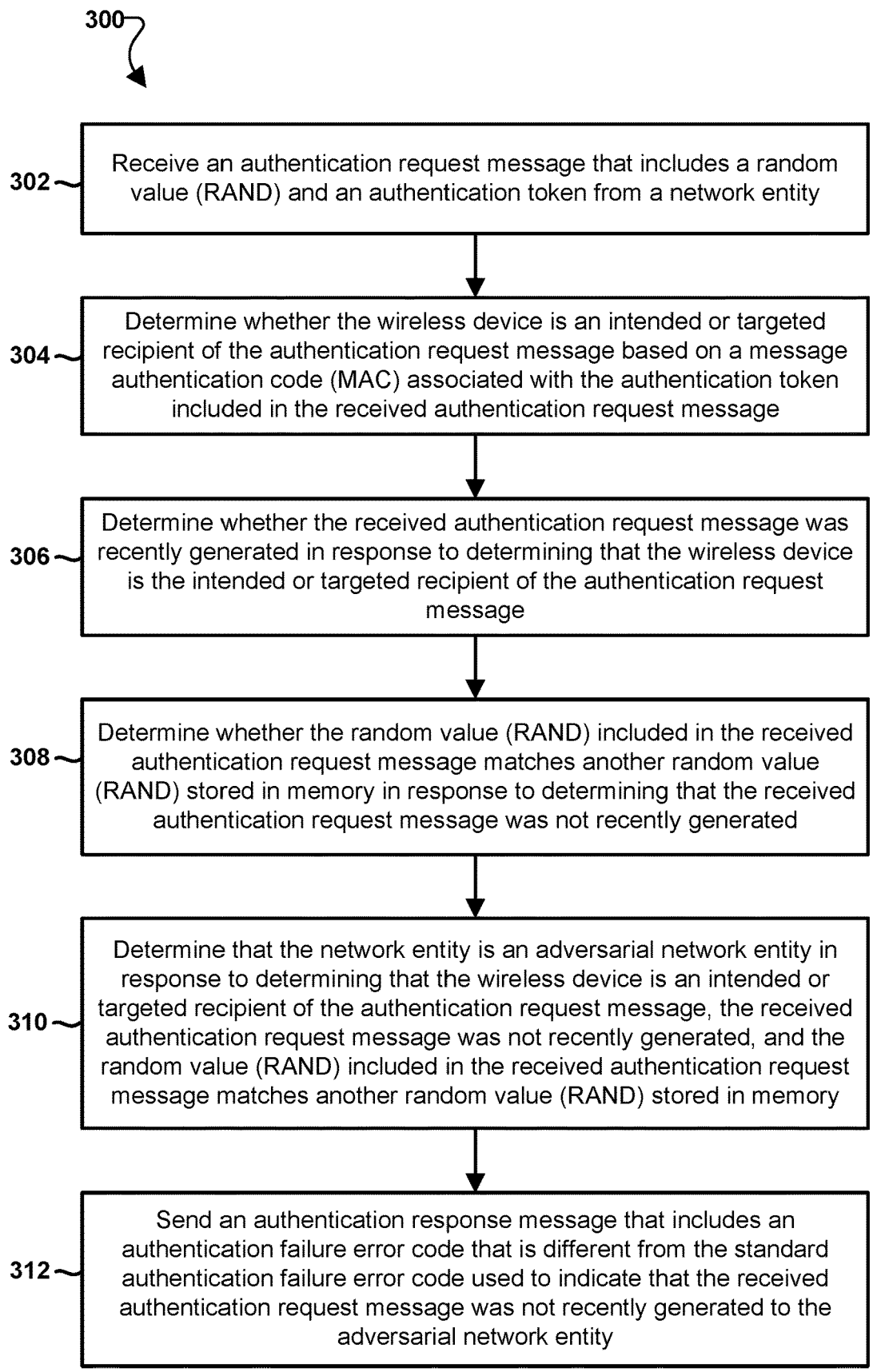
FIG. 3 is a process flow diagrams illustrating another method of detecting and preventing an adversarial network entity (fake base station) from Tracking a wireless device's location in accordance with an embodiment.

FIG. 3 illustrates a method 300 of detecting and preventing an adversarial network entity from tracking the location of the wireless device in accordance with an embodiment. The method 300 may be performed by a processor in a wireless device (e.g., wireless device 102 illustrated in FIG. 1, smartphone 500 illustrated in FIG. 5, etc.).

In block 302, a processor in a wireless device may receive an authentication request message that includes a random value (RAND) and an authentication token from a network entity. The random value (RAND) may be a 128-bit value generated via a Pseudo Random Number Generator (PRNG). The authentication token (AUTN) may be associated with a message authentication code (MAC) and a sequence number ($SQN_N$).

In block 304, the wireless device processor may determine whether the wireless device is an intended or targeted recipient of the authentication request message based on a message authentication code (MAC) associated with the authentication token included in the received authentication request message. For example, the wireless device processor may perform MAC verification operations to verify that the authentication request message was intended for the wireless device. The MAC verification operations may include the wireless device determining whether the MAC included in the received authentication request message was generated based on the shared secret long-term key ($K_{IMSI}$).

In block 306, the wireless device processor may determine whether the received authentication request message is recently generated in response to determining that the wireless device is the intended or targeted recipient of the authentication request message. For example, in block 306, the wireless device processor may verify that the authentication request message was recently generated by comparing a sequence number in the valid range used for authentication ($SQN_{MS}$) stored in the memory of the wireless device with the sequence number ($SQN_N$) included the received authentication request message.

In block 308, the wireless device processor may determine whether the random value (RAND) included in the received authentication request message matches another random authentication challenge value stored in memory. The memory may be a RAND database or cache memory (non-volatile memory) that stores previously received random value (RAND) values (e.g., all unique random values (RAND) received in the past day, week, month, etc.). In some embodiments, the wireless device processor may determine whether the random value (RAND) included in the received authentication request message matches another random value (RAND) stored in memory in response to determining that the received authentication request message is not recently generated. In some embodiments, in block 308, the wireless device processor may also determine whether the random value (RAND) included in the received authentication request message matches a random value (RAND) recently saved in the RAND database or cache memory (non-volatile memory).

In block 310, the wireless device processor may determine that the network entity is an adversarial network entity. In some embodiments, the wireless device processor may determine that the network entity is an adversarial network entity in response to determining that the random value (RAND) included in the received authentication request message matches another random value (RAND) stored in memory. That is, in some embodiments, the wireless device processor may determine that the network entity is an adversarial network entity in response to determining that the wireless device is an intended or targeted recipient of the authentication request message, the received authentication request message is not recently generated, and the random value (RAND) included in the received authentication request message matches another random value (RAND) stored in memory.

In block 312, the wireless device processor may send an authentication response message to the adversarial network entity. In some embodiments, the wireless device processor may generate the authentication response message to include an authentication failure error code that is different from the standard authentication failure error code used to indicate that the received authentication request message is not recently generated. For example, in many systems, the standard authentication failure error code "Sync Failure" is used to indicate that the sequence number ($SQN_N$) included the received authentication request message is not consistent with sequence numbers in a valid range used for authentication ($SQN_{MS}$) stored in by the wireless device (i.e., that the received authentication request message is not recently generated). In block 310, rather than generating the authentication failure message to indicate "Sync Failure" as the cause of failure in response to determining that the received authentication request message is not recently generated, in block 310 the wireless device processor may generate the authentication failure message to indicate "MAC Failure" as the cause of failure. By indicating "MAC Failure" (rather than "Sync Failure") as the cause of failure, the wireless device may prevent the malicious or nefarious actor from distinguishing the response received from its target from those it receives from all of the other wireless devices that are within the monitored area.

Figure 4:
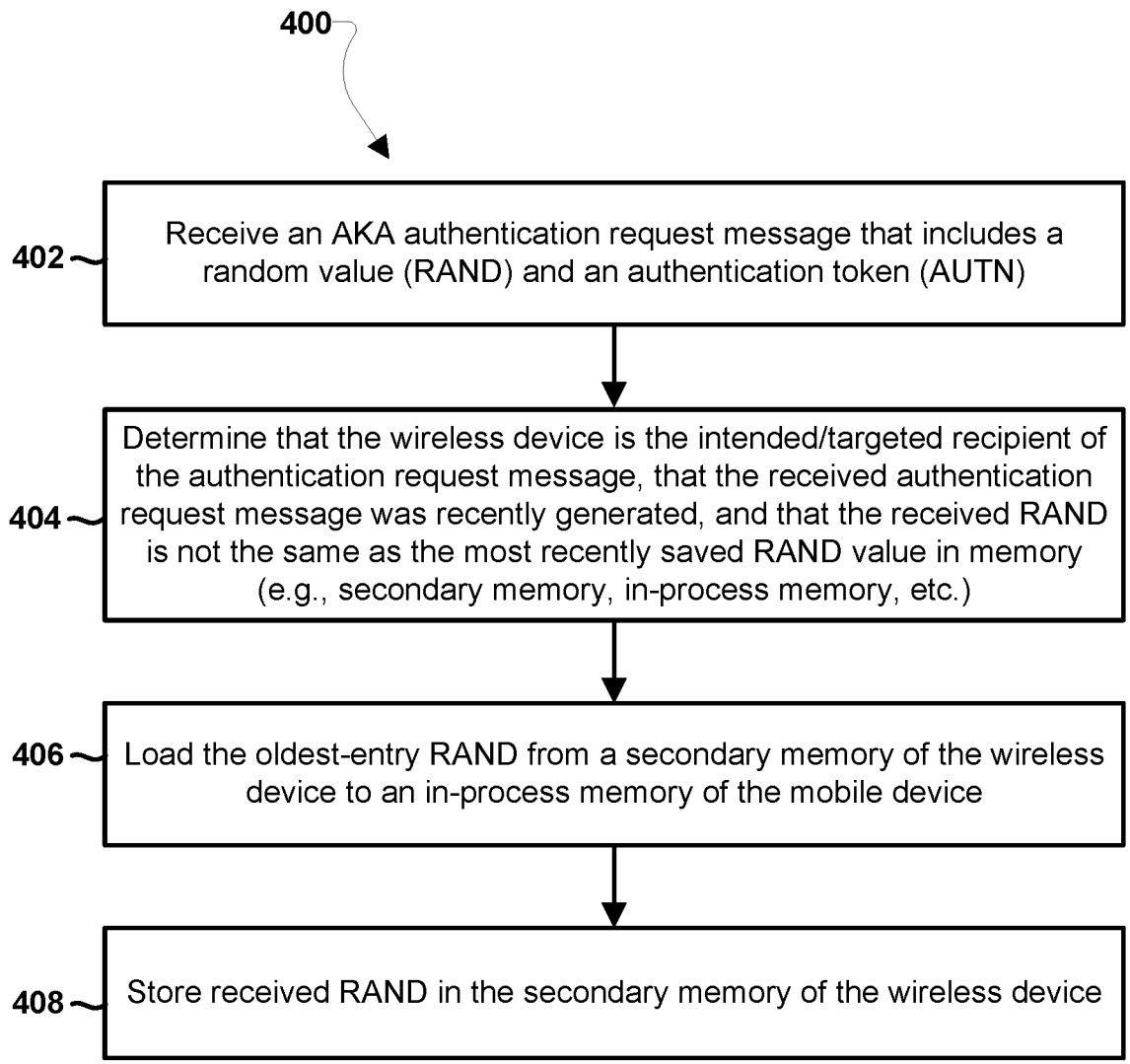
FIG. 4 is a process flow diagram illustrating method for storing random values (RAND) for using detecting an adversarial network entity (fake base station) in accordance with an embodiment.

FIG. 4 illustrates a method 400 of updating the memories of the wireless device with information that could be used to detect and prevent an adversarial network entity from tracking the location of the wireless device in accordance with an embodiment. The method 400 may be performed by a processor in a wireless device (e.g., wireless device 102 illustrated in FIG. 1, smartphone 500 illustrated in FIG. 5, etc.).

In block 402, a processor in a wireless device may receive an AKA authentication request message that includes a random value (RAND) and an authentication token (AUTN). The random value (RAND) may be a 128-bit value generated via a Pseudo Random Number Generator (PRNG). The authentication token (AUTN) may be associated with a message authentication code (MAC) and a sequence number ($SQN_N$).

In block 404, the wireless device processor may determine that the wireless device is the intended/targeted recipient of the authentication request message, that the received authentication request message is recently generated, and that the received RAND is not the same as the most recently saved random value (RAND) in memory (e.g., secondary memory, in-process memory, etc.). For example, the wireless device processor may determine whether the MAC included in the received authentication request message was generated based on the shared secret long-term key ($K_{IMSI}$) to verify that the authentication request message was intended for the wireless device. The wireless device processor may verify that the authentication request message was recently generated by comparing a sequence number in the valid range used for authentication ($SQN_{MS}$) stored in the memory of the wireless device with the sequence number ($SQN_N$) included the received authentication request message and determining whether the $SQN_N$ is in a valid range by calculating if $SQN_{MS}<=SQN_N<=(SQN_{MS}+range)$, where 'range' varies based on operator implementation. The wireless device processor may determine whether the random value (RAND) included in the received authentication request message matches another random authentication challenge value stored in memory in response to determining that a sequence number ($SQN_N$) associated with the received authentication request message is not consistent with sequence numbers the in a valid range used for authentication ($SQN_{MS}$) stored in the memory of the wireless device.

In block 406, the wireless device processor may load the oldest-entry RAND from a secondary memory of the wireless device to an in-process memory of the mobile device. The in-process memory may be a fast L1 or L2 cache memory, and/or a heap, stack, static global array, etc. of the process or wireless device processor. In some embodiments, the in-process memory may be DRAM or SRAM, which have high-speed read-write characteristics (i.e., short access times) and are typically used for temporary storage of execution code or for other operations that benefit from the high-speed read and write operations. In some embodiments, the in-process memory may be NVRAM. Unlike DRAM and SRAM memories, NVRAM memories are random-access memories that retain data even when power is turned off. However, like DRAM and SRAM memories, NVRAM memories have high-speed read-write characteristics (i.e., short access times). As such, using NVRAM memories allow a computing device to benefit from both the high-speed read-write characteristics of a random-access memory, and the information retention characteristics of ROMs or storage memories. NVRAM have a benefit over DRAM and SRAM memories in that there is no need to refresh the memory periodically, which saves power. However, NVRAM memories are expensive to manufacture and typically have a much smaller storage capacity than DRAM and SRAM memories. In addition, because NVRAM memories retain data, the information stored in NVRAM memories requires encryption and/or other similar security measures.

In block 408, the wireless device processor may store the received RAND in the secondary memory of the wireless device. Relative to the in-process memory, the secondary memory may be a larger and relatively slower memory (DRAM, SRAM, NRAM, FLASH, etc.). For example, the secondary memory may be a FLASH memory. A FLASH memory is an erasable and reprogrammable ROM or storage memory. FLASH memories are non-volatile in that they retain data when power is turned off. However, unlike NVRAM technologies, a FLASH memory is not a true random-access memory. A FLASH memory is not bit addressable and requires that the computing device read and write in large blocks. Additionally, reading or writing to a FLASH memory is a much slower operation than reading or writing to a NVRAM memory.

Figure 5:
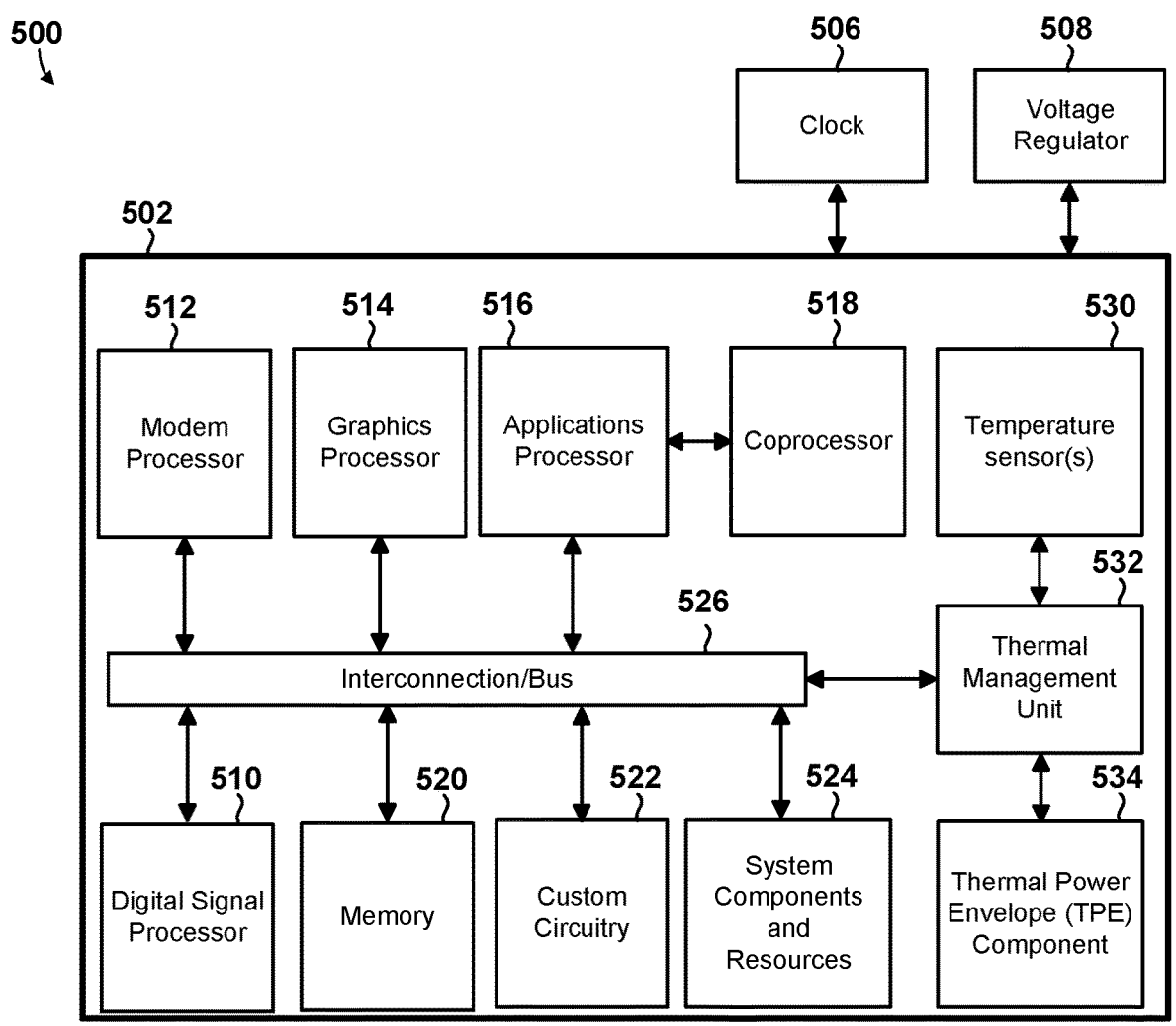
FIG. 5 is a component block diagram system in package (SIP) suitable for implementing various embodiments.

FIG. 5 illustrates an example computing system or SIP 500 architecture that may be used in wireless devices implementing the various embodiments. With reference to FIGS. 1-5, the illustrated example SIP 500 includes a system on chip (SOC) 502, a clock 506, and a voltage regulator 508. In some embodiments, the SOC 502 may operate as central processing unit (CPU) of the wireless device that carries out the instructions of software application programs by performing the arithmetic, logical, control and input/output (I/O) operations specified by the instructions.

The SOC 502 may include a digital signal processor (DSP) 510, a modem processor 512, a graphics processor 514, an application processor 516, one or more coprocessors 518 (such as vector co-processor) connected to one or more of the processors, memory 520, custom circuity 522, system components and resources 524, an interconnection/bus module 526, one or more temperature sensors 530, a thermal management unit 532, and a thermal power envelope (TPE) component 534.

Each processor 510, 512, 514, 516, 518 may include one or more cores, and each processor/core may perform operations independent of the other processors/cores. For example, the SOC 502 may include a processor that executes a first type of operating system (such as FreeBSD, LINUX, OS X, etc.) and a processor that executes a second type of operating system (such as MICROSOFT WINDOWS 10). In addition, any or all of the processors 510, 512, 514, 516, 518 may be included as part of a processor cluster architecture (such as a synchronous processor cluster architecture, an asynchronous or heterogeneous processor cluster architecture, etc.).

The SOC 502 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 524 of the SOC 502 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 524 or custom circuitry 522 also may include circuitry to interface with peripheral devices, such as cameras, electronic displays, wireless communication devices, external memory chips, etc.

The SOC 502 may further include an input/output module (not illustrated) for communicating with resources external to the SOC, such as a clock 506 and a voltage regulator 508. Resources external to the SOC (such as clock 506, voltage regulator 508) may be shared by two or more of the internal SOC processors/cores.

In addition to the example SIP 500 discussed above, some embodiments may be implemented in a wide variety of computing systems, which may include a single processor, multiple processors, multicore processors, or any combination thereof.

Figure 6:
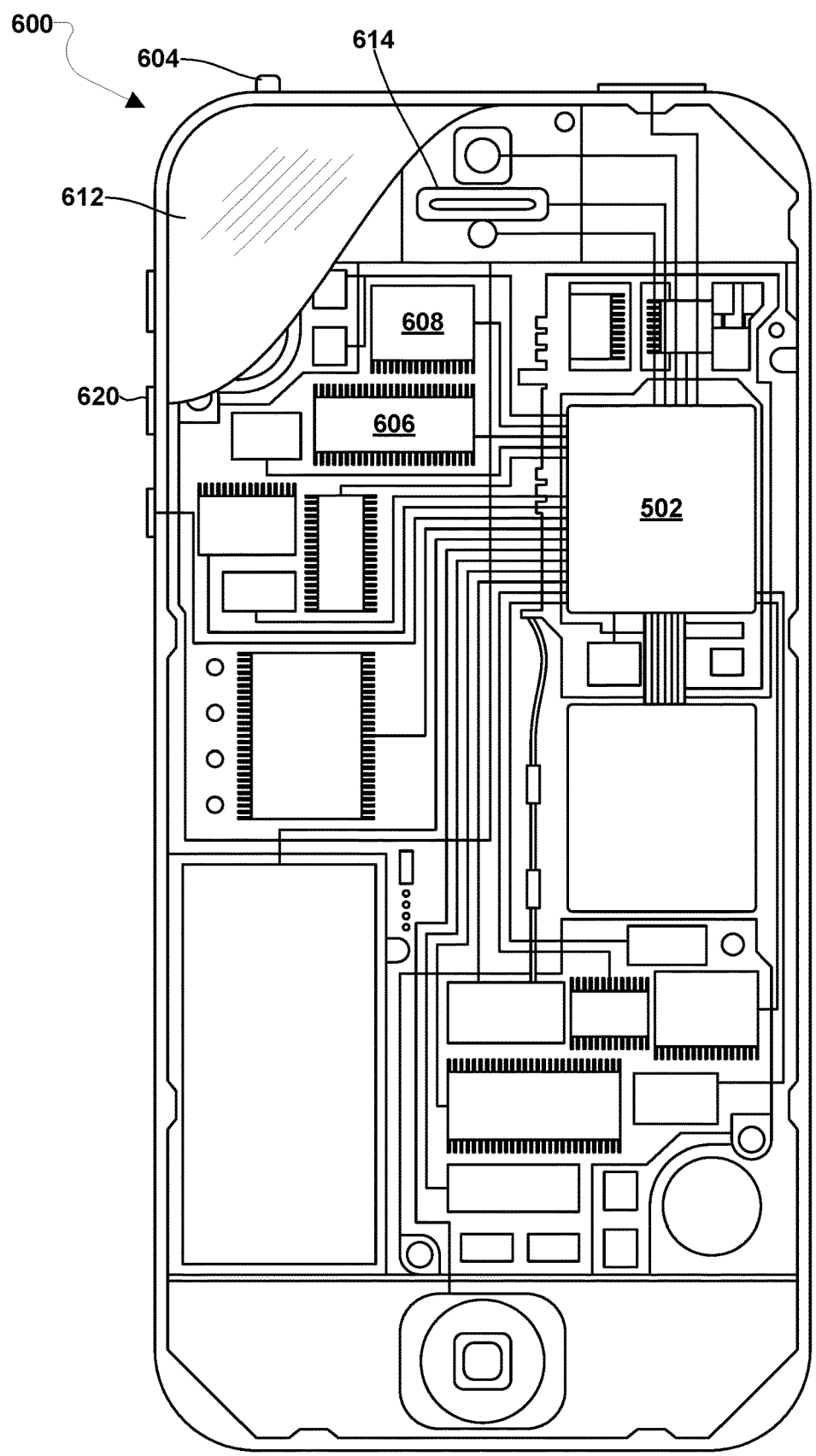
FIG. 6 is a component block diagram illustrating a wireless device suitable for implementing various embodiments.

Various embodiments may be implemented on a variety of wireless devices an example of which is illustrated in FIG. 6 in the form of a smartphone. A smartphone 600 may include a system on chip 502 as describe with reference to FIG. 5. Additionally, the smartphone 600 may include an antenna 604 for sending and receiving electromagnetic radiation that may be connected to a wireless data link and/or cellular telephone transceiver 608 coupled to one or more processors in the SOC 502. Smartphones 600 typically also include menu selection buttons or rocker switches 620 for receiving user inputs.

A typical smartphone 600 also includes a display 612 coupled to the system on chip 502. A typical smartphone 600 also includes a sound encoding/decoding (CODEC) circuit 606, which digitizes sound received from a microphone into data packets suitable for wireless transmission and decodes received sound data packets to generate analog signals that are provided to the speaker 614 to generate sound. Also, one or more of the processors in the SOC 502, transceiver 608 and CODEC circuit 606 may include a digital signal processor (DSP) circuit (not shown separately).

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described in various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers.

Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of detecting one or more adversarial network entities, comprising:
    receiving, by a processor in a wireless device, an authentication request message that includes an authentication token (AUTN) and a random value (RAND) from a network entity;
    determining whether a message authentication code (MAC) associated with the authentication token (AUTN) included in the received authentication request message is valid;
    determining whether a sequence number ($SQN_{NN}$) in the received authentication request message is in a valid range in response to determining that the MAC is valid;
    determining whether the random value (RAND) included in the received authentication request message matches another random value (RAND) stored as part of an ordered list of random values (RAND) in a memory of the wireless device in response to determining that the $SQN_{NN}$ of the received authentication request message is not in the valid range;
    determining that the network entity is an adversarial network entity in response to determining that the MAC is valid, the $SQN_{NN}$ of the received authentication request message is not in the valid range, and the random value (RAND) included in the received authentication request message matches another random value (RAND) stored in the memory of the wireless device;
    generating an authentication response message that includes a synchronization failure error code in response to determining that the random value (RAND) included in the received authentication request message does not match another random value (RAND) stored in the memory of the wireless device;
    generating the authentication response message to include a "MAC Failure" error code in response to determining that the random value (RAND) included in the received authentication request message matches another random authentication challenge value stored in the memory of the wireless device; and
    sending the generated authentication response message to the network entity.

2. The method of claim 1, wherein:
    determining whether the MAC is valid comprises following a standard approach of determining whether the MAC associated with the authentication token (AUTN) included in the received authentication request message was generated based on a shared secret long-term key; and
    determining whether the received authentication request message is recently generated comprises comparing a sequence number in the valid range used for authentication ($SQN_{MS}$) stored in the memory of the wireless device with a sequence number ($SQ_{NN}$) associated with the authentication token (AUTN) included in the received authentication request message.

3. The method of claim 1, wherein receiving the authentication request message that includes the random value (RAND) and the authentication token (AUTN) from the network entity comprises receiving a RAND generated by a 128-bit Pseudo Random Number Generator (PRNG).

4. The method of claim 1, further comprising:
    determining whether the random value (RAND) included in the received authentication request message is the same as a most recently stored random value (RAND);
    updating the memory of the wireless device to include the random value (RAND) included in the received authentication request message in response to determining that the random value (RAND) included in the received authentication request message is not the same as the most recently stored random value (RAND); and
    forgoing updating of the memory of the wireless device in response to determining that the random value (RAND) included in the received authentication request message is the same as the most recently stored random value (RAND).

5. The method of claim 4, wherein updating the memory of the wireless device to include the random value (RAND) included in the received authentication request message comprises:
    loading an oldest-entry random value (RAND) from a secondary memory of the wireless device to an in-process memory of the wireless device; and
    storing the random value (RAND) included in the received authentication request message in the secondary memory of the wireless device.

6. The method of claim 5, wherein determining whether the random value (RAND) included in the received authentication request message matches another random value (RAND) stored in the memory of the wireless device comprises determining whether the random value (RAND) included in the received authentication request message matches another random value (RAND) stored in the in-process memory of the wireless device.

7. A wireless device, comprising:
    a memory; and
    a processor coupled to the memory and configured with processor-executable software instructions to:
        receive an authentication request message that includes an authentication token (AUTN) and a random value (RAND) from a network entity;
        determine whether a message authentication code (MAC) associated with the authentication token (AUTN) included in the received authentication request message is valid;
        determine whether a sequence number ($SQN_{NN}$) in the received authentication request message is in a valid range in response to determining that the MAC is valid;
        determine whether the random value (RAND) included in the received authentication request message matches another random value (RAND) stored as part of an ordered list of random values (RAND) in the memory in response to determining that the $SQN_{NN}$ of the received authentication request message is not in the valid range;

determine that the network entity is an adversarial network entity in response to determining that the MAC is valid, the $SQN_{NN}$ of the received authentication request message is not in the valid range, and the random value (RAND) included in the received authentication request message matches another random value (RAND) stored in the memory;

generate an authentication response message that includes a synchronization failure error code in response to determining that the random value (RAND) included in the received authentication request message does not match another random value (RAND) stored in the memory of the wireless device;

generate the authentication response message to include a "MAC Failure" error code in response to determining that the random value (RAND) included in the received authentication request message matches another random authentication challenge value stored in the memory of the wireless device; and send the generated authentication response message to the network entity.

8. The wireless device of claim 7, wherein the processor is further configured with processor-executable software instructions to:

determine whether the MAC is valid by following a standard approach of determining whether the MAC associated with the authentication token (AUTN) included in the received authentication request message was generated based on a shared secret long-term key; and determine whether the received authentication request message is recently generated by comparing a sequence number in the valid range used for authentication ($SQN_{MS}$) stored in the memory with a sequence number ($SQ_{NN}$) associated with the authentication token (AUTN) included in the received authentication request message.

9. The wireless device of claim 7, wherein the processor is further configured with processor-executable software instructions to receive the authentication request message that includes the random value (RAND) and the authentication token (AUTN) from the network entity by receiving a random value (RAND) generated by a 128-bit Pseudo Random Number Generator (PRNG).

10. The wireless device of claim 7, wherein the processor is further configured with processor-executable software instructions to:

determine whether the random value (RAND) included in the received authentication request message is the same as a most recently stored random value (RAND);

update the memory to include the random value (RAND) included in the received authentication request message in response to determining that the random value (RAND) included in the received authentication request message is not the same as the most recently stored random value (RAND); and forgo updating of the memory in response to determining that the random value (RAND) included in the received authentication request message is the same as the most recently stored random value (RAND).

11. The wireless device of claim 10, wherein the processor is further configured with processor-executable software instructions to update the memory to include the random value (RAND) included in the received authentication request message by:

loading an oldest-entry random value (RAND) from a secondary memory to an in-process memory of the wireless device; and storing the random value (RAND) included in the received authentication request message in the secondary memory.

12. The wireless device of claim 11, wherein the processor is further configured with processor-executable software instructions to determine whether the random value (RAND) included in the received authentication request message matches another random value (RAND) stored in the memory by determining whether the random value (RAND) included in the received authentication request message matches another random value (RAND) stored in the in-process memory.

13. A non-transitory computer readable storage medium having stored thereon processor-executable software instructions configured to cause a processor in a wireless device to perform operations comprising:

receiving an authentication request message that includes an authentication token (AUTN) and a random value (RAND) from a network entity;

determining whether a message authentication code (MAC) associated with the authentication token (AUTN) included in the received authentication request message is valid;

determining whether a sequence number ($SQN_{NN}$) in the received authentication request message is in a valid range in response to determining that the MAC is valid;

determining whether the random value (RAND) included in the received authentication request message matches another random value (RAND) stored as part of an ordered list of random values (RAND) in a memory of the wireless device in response to determining that the $SQN_{NN}$ of the received authentication request message is not in the valid range;

determining that the network entity is an adversarial network entity in response to determining that the MAC is valid, the $SQN_{NN}$ of the received authentication request message is not in the valid range, and the random value (RAND) included in the received authentication request message matches another random value (RAND) stored in the memory of the wireless device;

generating an authentication response message that includes a synchronization failure error code in response to determining that the random value (RAND) included in the received authentication request message does not match another random value (RAND) stored in the memory of the wireless device;

generating the authentication response message to include a "MAC Failure" error code in response to determining that the random value (RAND) included in the received authentication request message matches another random authentication challenge value stored in the memory of the wireless device; and sending the generated authentication response message to the network entity.

14. The non-transitory computer readable storage medium of claim 13, wherein the stored processor-executable software instructions are configured to cause the processor in the wireless device to perform operations such that:

determining whether the MAC is valid comprises following a standard approach of determining whether the MAC associated with the authentication token (AUTN) included in the received authentication request message was generated based on a shared secret long-term key; and determining whether the received authentication request message is recently generated comprises comparing a sequence number in the valid range used for authentication ($SQN_{MS}$) stored in the memory of the wireless device with a sequence number ($SQ_{NN}$) associated with the authentication token (AUTN) included in the received authentication request message.

15. The non-transitory computer readable storage medium of claim 13, wherein the stored processor-executable software instructions are configured to cause the processor in the wireless device to perform operations such that receiving the authentication request message that includes the random value (RAND) and the authentication token (AUTN) from the network entity comprises receiving a random value (RAND) generated by a 128-bit Pseudo Random Number Generator (PRNG).

16. The non-transitory computer readable storage medium of claim 13, wherein the stored processor-executable software instructions are configured to cause the processor in the wireless device to perform operations further comprising:
determining whether the random value (RAND) included in the received authentication request message is the same as a most recently stored random value (RAND);
updating the memory of the wireless device to include the random value (RAND) included in the received authentication request message in response to determining that the random value (RAND) included in the received authentication request message is not the same as the most recently stored random value (RAND); and
forgoing updating of the memory of the wireless device in response to determining that the random value (RAND) included in the received authentication request message is the same as the most recently stored random value (RAND).

17. The non-transitory computer readable storage medium of claim 16,
wherein the stored processor-executable software instructions are configured to cause the processor in the wireless device to perform operations such that updating the memory of the wireless device to include the random value (RAND) included in the received authentication request message comprises:
loading an oldest-entry random value (RAND) from a secondary memory of the wireless device to an in-process memory of the wireless device; and
storing the random value (RAND) included in the received authentication request message in the secondary memory of the wireless device, and
wherein the stored processor-executable software instructions are configured to cause the processor in the wireless device to perform operations such that determining whether the random value (RAND) included in the received authentication request message matches another random value (RAND) stored in the memory of the wireless device comprises determining whether the random value (RAND) included in the received authentication request message matches another random value (RAND) stored in the in-process memory of the wireless device.

18. A wireless device, comprising:
means for receiving an authentication request message that includes an authentication token (AUTN) and a random value (RAND) from a network entity;
means for determining whether a message authentication code (MAC) associated with the authentication token (AUTN) included in the received authentication request message is valid;
means for determining whether a sequence number ($SQN_{NN}$) in the received authentication request message is in the valid range in response to determining that the MAC is valid;
means for determining whether the random value (RAND) included in the received authentication request message matches another random value (RAND) stored as part of an ordered list of random values (RAND) in a memory of the wireless device in response to determining that the $SQN_{NN}$ of the received authentication request message is not in the valid range;
means for determining that the network entity is an adversarial network entity in response to determining that the MAC is valid, the $SQN_{NN}$ of the received authentication request message is not in the valid range, and the random value (RAND) included in the received authentication request message matches another random value (RAND) stored in the memory of the wireless device;
means for generating an authentication response message that includes a synchronization failure error code in response to determining that the random value (RAND) included in the received authentication request message does not match another random value (RAND) stored in the memory of the wireless device;
means for generating the authentication response message to include a "MAC Failure" error code in response to determining that the random value (RAND) included in the received authentication request message matches another random authentication challenge value stored in the memory of the wireless device; and
means for sending the generated authentication response message to the network entity.

19. The wireless device of claim 18, wherein:
means for determining whether the MAC is valid comprises means for following a standard approach of determining whether the MAC associated with the authentication token (AUTN) included in the received authentication request message was generated based on a shared secret long-term key; and
means for determining whether the received authentication request message is recently generated comprises means for comparing a sequence number in the valid range used for authentication ($SQN_{MS}$) stored in the memory of the wireless device with a sequence number ($SQ_{NN}$) associated with the authentication token (AUTN) included in the received authentication request message.

20. The wireless device of claim 18, wherein means for receiving the authentication request message that includes the random value (RAND) and the authentication token (AUTN) from the network entity comprises means for receiving a random value (RAND) generated by a 128-bit Pseudo Random Number Generator (PRNG).

21. The wireless device of claim 18, further comprising:
means for determining whether the random value (RAND) included in the received authentication request message is the same as a most recently stored random value (RAND);
means for updating the memory of the wireless device to include the random value (RAND) included in the received authentication request message in response to determining that the random value (RAND) included in the received authentication request message is not the same as the most recently stored random value (RAND); and means for forgoing updating of the memory of the wireless device in response to determining that the random value (RAND) included in the received authentication request message is the same as the most recently stored random value (RAND).

22. The wireless device of claim 21,
wherein means for updating the memory of the wireless device to include the random value (RAND) included in the received authentication request message comprises:
   means for loading an oldest-entry random value (RAND) from a secondary memory of the wireless device to an in-process memory of the wireless device; and
   means for storing the random value (RAND) included in the received authentication request message in the secondary memory of the wireless device, and
wherein means for determining whether the random value (RAND) included in the received authentication request message matches another random value (RAND) stored in the memory of the wireless device comprises means for determining whether the random value (RAND) included in the received authentication request message matches another random value (RAND) stored in the in-process memory of the wireless device.

* * * * *